United States Patent
Hayhurst et al.

(10) Patent No.: US 6,622,790 B1
(45) Date of Patent: Sep. 23, 2003

(54) METHOD FOR ENHANCING GAS WELL SECONDARY RECOVERY OPERATIONS

(76) Inventors: John Hayhurst, 3000 Harmony, Amarillo, TX (US) 79106; Brian Holt, 12075 County Rd. 20, Spearman, TX (US) 75149

( * ) Notice: Subject to any disclaimer, the term of this patent is extended or adjusted under 35 U.S.C. 154(b) by 0 days.

(21) Appl. No.: 10/135,718

(22) Filed: Apr. 30, 2002

(51) Int. Cl.[7] .............................................. E21B 43/27
(52) U.S. Cl. ....................... 166/307; 166/311
(58) Field of Search ................................ 166/279, 292, 166/295, 305.1, 311, 294, 274, 268, 312, 307

(56) References Cited

U.S. PATENT DOCUMENTS

| | | | |
|---|---|---|---|
| 3,164,206 A | 1/1965 | Sharp | |
| 3,902,557 A | * 9/1975 | Shaughnessy et al. | 166/295 |
| 3,909,422 A | 9/1975 | Sample, Jr. | |
| 4,440,229 A | 4/1984 | Burch | |
| 4,455,175 A | 6/1984 | Settineri et al. | |
| 4,541,483 A | * 9/1985 | Walton | 166/270.2 |
| 4,557,837 A | * 12/1985 | Clark et al. | 507/205 |
| 4,593,764 A | 6/1986 | Lilienthal | |
| 5,002,128 A | * 3/1991 | Wiseman, Jr. | 166/307 |
| 5,441,927 A | 8/1995 | Mueller et al. | |
| 5,461,028 A | 10/1995 | Mueller et al. | |
| 5,904,208 A | 5/1999 | Ray et al. | |
| 6,165,946 A | 12/2000 | Mueller et al. | |
| 6,182,759 B1 | * 2/2001 | Burger et al. | 166/305.1 |
| 6,196,320 B1 | 3/2001 | Ray et al. | |

* cited by examiner

Primary Examiner—Frank Tsay
(74) Attorney, Agent, or Firm—Carstens, Yee & Cahoon, LLP; Scott L. Harper

(57) ABSTRACT

The present invention relates to a process and system for the remediation and enhancement of secondary recovery gas from a natural gas well and geologic formation. The present invention employs the use of protic and aprotic solvents which are injected in sequence into the well and geologic formation. The protic and aprotic solvents are injected into the well bore and progress through the geologic fissures and pores of the geologic formation. After reacting with the downhole and geologic formation deposits, the solvent solute, containing the remaining solvent, dissolved solids and debris, and any remaining components are extracted from the well and formation resulting in improved gas well flow rate through the formation and well bore.

20 Claims, 2 Drawing Sheets

METHOD FOR ENHANCING GAS WELL SECONDARY RECOVERY OPERATIONS

BACKGROUND OF THE INVENTION

1. Technical Field

The present invention relates to method and system for enhancing secondary recovery operations by removing solids and other debris from a gas well. More particularly, the present invention provides a method and system by which solids and debris are removed from a gas well bore and formation by the addition and removal of chemical constituents which results in relieving flow restrictions in well bores and formations in an economical fashion.

2. Description of Related Art

Oil and natural gas hydrocarbon reservoirs form as a consequence of the transformation of organic matter into various types of hydrocarbon materials, including coals, tars, oils, paraffin waxes and natural gas. It is believed that oil and gas reservoirs form as lighter hydrocarbon molecules percolate toward the surface of the earth until they are trapped in a relatively permeable layer beneath a relatively impermeable layer that 'caps' the permeable layer. The lighter hydrocarbon molecules continue accumulating, often accompanied by water molecules, into relatively large subsurface reservoirs. Since the reservoirs exist at various depths within the earth, they are often under substantial geostatic pressure.

In the last century, natural gas and oil have been extracted by drilling a borehole into the sub-surface geologic formations. In general, most formations were naturally pressurized by the presence of free natural gas that accumulated above the liquid oil layer and, often, by water that accumulated below the liquid oil layer. Since naturally occurring crude oil has a density lower than that of water (i.e., ranging from 0.7 in the case of "light" crude oil to 0.9 in the case of "heavy" crude oil), crude oil accumulates above the water-permeated layer and below the gas-permeated layer of the formation. Thus, a well terminating within the oil-permeated layer would yield oil that receives its driveout energy from an overlying gas-permeated layer and/or an underlying water-permeated layer.

In general, the primary recovery of oil and gas occurs during that period of time that the natural pressurization of a reservoir causes the oil and gas to be driven upwardly through the well bore. At some point in the operating life of the reservoir, the naturally occurring pressurization is effectively depleted. Several different methods, known generally as secondary recovery methods, have been developed to extract oil or natural gas after natural pressurization in the formation is exhausted.

Secondary recovery operations involve re-pressurizing the reservoir with a fluid (i.e., a foreign liquid or a gas) to drive the remaining oil and gas in the permeated layer to the surface through one or more wells. Various fluids, including water at various temperatures, steam, carbon dioxide, and nitrogen, have been used to effect the re-pressurization of the reservoir and the displacement of the desired crude oil from its rock or sand matrix toward the production wells. The drive fluid is introduced into the reservoir by injection wells which pump the pressurized drive fluid into the reservoir to displace and thereby drive the oil or gas toward and to the producing wells. However, physical blockages and obstacles tend to appear in the formation and well bore as a result of chemical and biological reactions which take place during primary and secondary recovery operations. In turn, these blockages restrict the flow of oil and gas into and up through the well bore.

Historically, gas wells provide positive pressure and expel gas from the well bore into the less pressurized area of the gas gathering system. This positive pressure depends greatly on time of first production and geographical formations in the area. Over a period of time, as gas wells are produced, the flow rates at which gas is recovered decreases and the wells slip below atmospheric pressure, 26–28 inches Hg. At this point in order to recover gas the well must be vacuumed which results in the gas being "sucked" out of the well.

The slowing of production can be due to several factors. One common school of thought is that no gas remains in the well. Another idea is that small particulate matter is clogging the hole that the gas is traveling through to get to the well bore. Many wells have been successfully cleaned and large quantities of gas were found remaining in the well. Current philosophy states that wells become "clogged" with solid particulate matter. For example, a formation maybe likened to a giant sponge. The formation is filled with tiny holes, cracks and fissures similar to the porous nature of a sponge. As we "drag" gas particles from the farthest reaches of the well, they carry small solid particles with them. These particles accumulate in the pores, cracks and fissures of the formation and begin to obstruct the flow of gas through the formation. A positive pressure well has the ability to push these particles out with the gas, but a negative pressure or "vacuum" well leaves the solid particles in the formation.

With the accumulation of this particulate matter, the environment inside the well bore changes. An anaerobic environment is formed as the flow of oil and gas is drawn back out into the formation. Static pressure gradients are formed between the formation and the well bore and then bacterial production occurs. A major product of these bacteria, along with other sources, is hydrogen sulfide gas ($H_2S$), which is an extremely toxic gas, which can pose a major health and safety problem to those working around the well. After years of drawing on a well with vacuum pressure, the rate at which gas can be extracted from the well becomes greatly diminished.

Currently, the most common practices to remove debris from the well and formation include chemical acid washes, salt water washes, steam treatments, emulsifying enzyme agents, bacterial agents and physical stimulation using large sand fraction machinery. By far, the most common practice is to use a strong acid to dissolve the particulate matter residing in the well. While these methods are somewhat effective they leave behind unwanted by-products such as hydrogen sulfide gas and related precipitates.

In order to clear the well of particulate matter and to induce positive pressure gradients, the standard practice has been to perform an "acid job" on the well. This procedure involves injecting a concentrated acid into the well. There are several inherent problems with acid treatment procedures. Acid will only dissolve particles with similar atomic composition. Although acid treatment may bring an immediate improvement in gas production, over time the production will slow and decrease below prior production flow rates. Undesirable salt by products are also formed in acid treatments, since acids have a chemical tendency to produce salts. For example, hydrochloric acid (HCL) will leave behind free chlorine atoms, which will then bond with alkaline metals and other compounds present in the well or formation environment to form a salt. This build up of salt in the well causes the well to become clogged, thereby causing a decrease in production flow rate. Still another drawback with acid jobs is the tendency of acids to produce the toxic gas, $H_2S$. Since sulfur is found abundantly in both its elemental form and in compounds, liberated hydrogen from "acid jobs" can bond with the sulfur to form hydrogen sulfide ($H_2S$) gas. As previously discussed, hydrogen sulfide ($H_2S$) gas poses major health concerns and is considered an extremely hazardous substance for anyone working in the areas where it is present. Acid washing a well is quite expensive and usually not economically feasible in terms of capital expense compared with production returns.

Other common practices in gas well cleaning have included the use of chlorinated solvents. While these solvents are good cleaning agents, they pose major health concerns. Many of the solvents are so toxic that it is not safe for any but the most highly trained workers to handle them. Even if they ate selected for use on the well, Class A HAZMAT protection is mandated. A well known and widely used chlorinated solvent, Carbon Tetrachloride ($CCL_4$), has been listed as a known carcinogen and hazardous to human health. These solvents are becoming regulated to such a degree that it makes their use impractical. The cost of procuring chlorinated compounds also makes using many chlorinated solvents impractical and cost prohibitive.

The current existing prior art discloses various methods and systems of remediating well bores. For example, U.S. Pat. No. 4,455,175 (Settineri et. al.) which discloses a method for removing paraffin build up on surfaces in contact with crude oil; U.S. Pat. No. 4,440,229 (Burch) which discloses an oil well servicing process; U.S. Pat. No. 6,196,320 B1 (Ray et. al.) a method of cleaning a well bore prior to installing a water based fluid system; U.S. Pat. No. 5,904,208 (Ray et. al.) a method for cleaning a well bore prior to cementing; U.S. Pat. No. 3,909,422 (Sample, Jr.) a method for removing Elemental Sulfur in sour gas wells; U.S. Pat. No. 3,164,206 (Sharp) a method and product for producing flow in dead wells; U.S. Pat. No. 5,441,927 (Mueller et. al.) fluid drill-hole treatment agents based on polycarbonic acid diesters; U.S. Pat. No. 5,461,028 (Mueller et al.) fluid drill-hole treatment agents based on carbonic acid diesters; U.S. Pat. No. 6,165,946 (Mueller et. al.) process for the facilitated waste disposal of working substances based on water in oil invert emulsions; and, U.S. Pat. No. 4,593,764 (Lilienthal) removal of pipe dope constrictions.

In view of the prior art, a need exists for an effective chemical method of utilizing a chemical solvent combination to efficiently and safely conduct secondary recovery operations on a gas well and the surrounding formation. Likewise, a need exists for conducting secondary recovery operations utilizing a chemical combination of solvating compounds which effectively removes well and formation blockages due to the deposition and build up of sulfur, paraffins, and salt compounds without causing damage to the well or geologic formation environment.

SUMMARY OF THE INVENTION

The present invention relates to a process and method for the remediation and enhancement of secondary recovery operations conducted on a natural gas well and geologic formation. The present invention employs the use of an aprotic and protic solvents. These constituents, along with a strong electrolyte which dissociates completely in the resulting aqueous solution, are injected in sequence and in variable concentrations depending on the existing conditions in the well and formation. The chemical combination of protic and aprotic solvents is injected into the well and surrounding formation. After injection, each solvent travels down the well and through the geologic fissures and pores of the formation contacting debris and reacting therewith. These reactions result in the formation of a solvent solute, an aprotic solvent solute and a protic solvent solute, which contain both the solvent and solvated debris which are then extracted from the formation and well. The removal of debris from the well and formation results in improved gas flow rates and, thus, greater volumes of natural gas recovered from the well.

The present invention accomplishes several goals of the invention discussed herein, namely, (1) to provide a method of removing deposits and obstructions in such a way that no salts are left behind to further obstruct the well, (2) to remove salts left by prior acid jobs, (3) providing a safe and mild organic solvent to accomplish well bore and formation cleaning, including any associated cracks or fissures in the formation, so that a fluid could easily flow through the formation during well operations; and, (4) the use of a strong base to clean the formation and leave the well in a non hazardous natural environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

During the initial phase of the inventive method disclosed herein, several soil and media samples will be taken from the subject well upon which secondary recovery operations will be conducted. The media sample(s) will be analyzed for chemical make up and tested against the solvents used in the inventive process discussed herein to determine solubility and effectiveness. The media samples will also be used to determine the concentration of the solvating chemicals necessary to effectively clean the subject well and formation. The laboratory procedure and analysis employed is well known to those of ordinary skill in the art.

Figure 1:
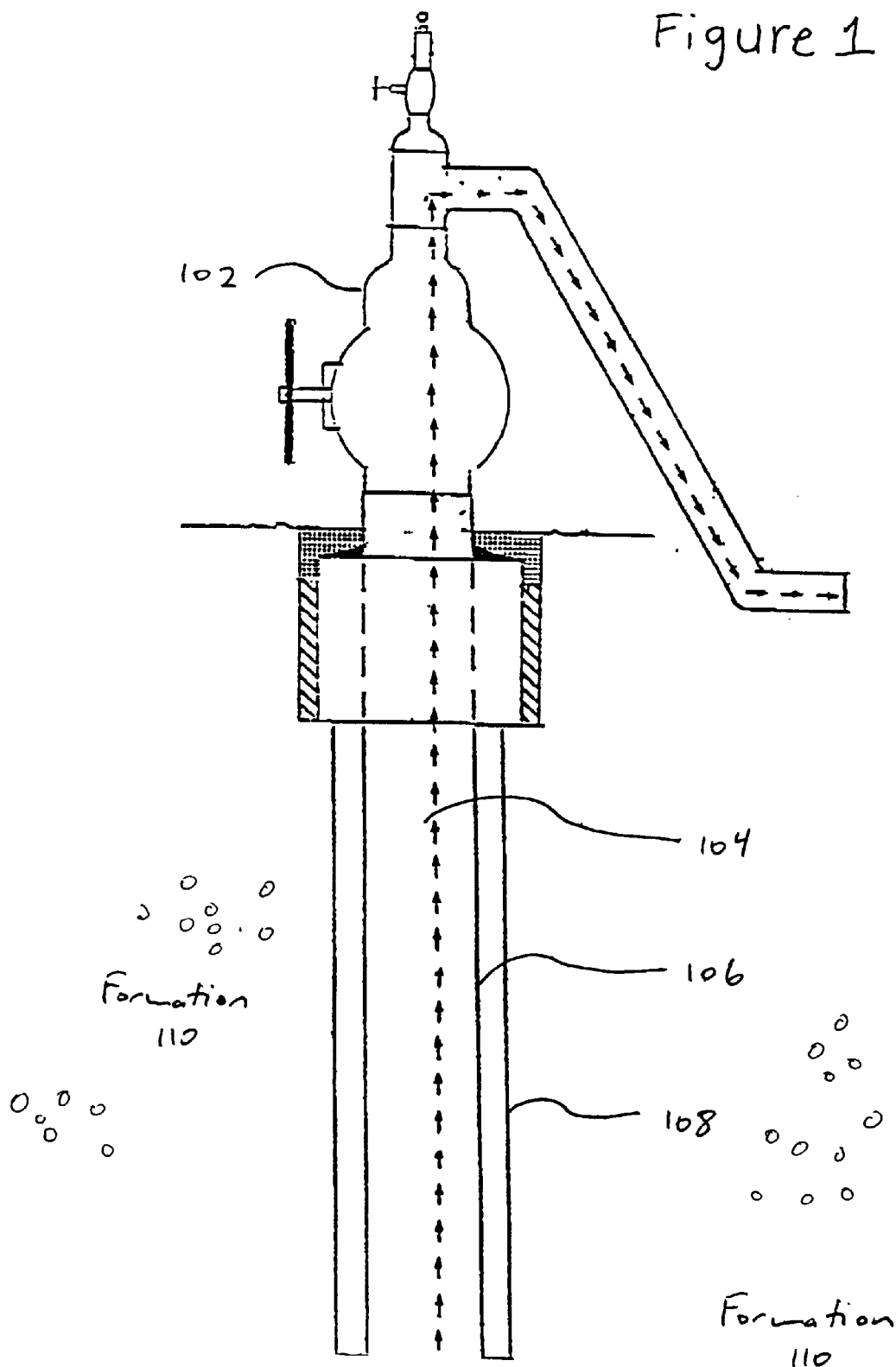
FIG. 1 is a profile view of a typical geologic formation with a well.

FIG. 1 is a typical profile representation of a gas well installation with surrounding formation 100. In this depiction, drilling operations have been completed and wellhead 102 has been installed to regulate the flow of natural gas and/or oil out of the formation 110 via well 104. Well 104 is created during drilling operations wherein tubing 106 and production casing 108 are inserted into the formation 110 to provide for the collection of natural gas and/or oil products from the formation 110. The apparatus and methods for well drilling and casing geologic formations are well known to those of ordinary skill in the art.

Figure 2:
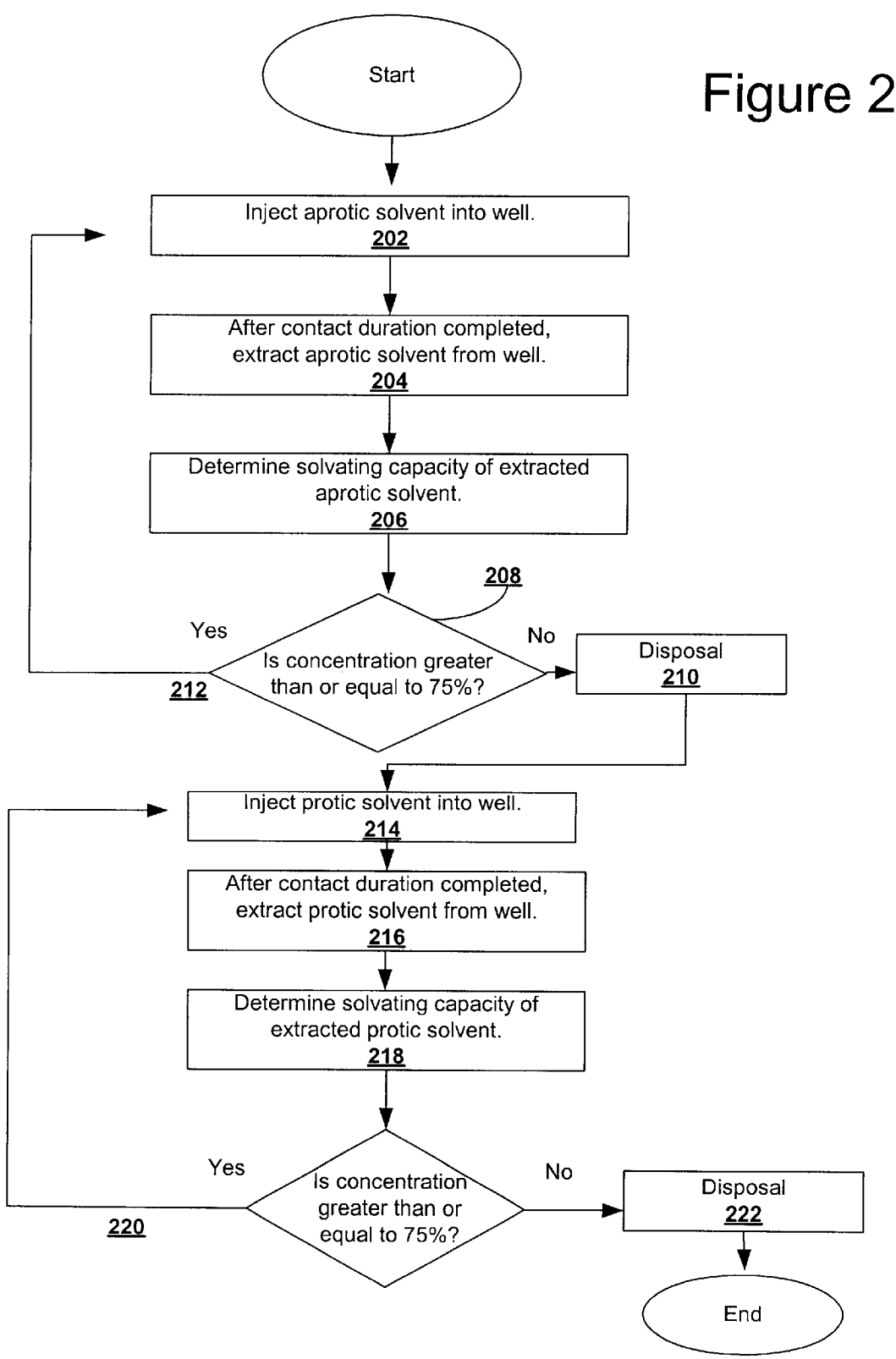
FIG. 2 is a flowchart depicting the method of removing downhole and formation debris according to the invention disclosed herein.

FIG. 2 is a flow diagram discussing the method of secondary recovery operations set forth herein. The first step in the well cleaning method discussed herein involves injecting a predetermined amount of an aprotic solvent, such as methylene chloride ($CH_2Cl_2$), into the well preferably in a liquid state (Step 202). An aprotic solvent may be defined as a substance which neither accepts nor donates protons when reacting with other substances. For example, methylene chloride is a chlorinated solvent which is aprotic in nature. Aprotic solvents exhibit a moderately high dielectric constant and do not contain acidic hydrogen. Methylene chloride has a fairly strong polar make up due to electronegativity and dipole moments which are chemically several times larger than that of water ($H_2O$). These chemical properties of aprotic solvents make them very desirable and capable of dissolving the chemical constituents of gas well debris.

The quantity of aprotic solvent injected into the well is determined by the amount of water the well is producing. Specifically, when a well has been idle for over a forty-eight hour period, the amount of aprotic solvent required will be roughly one fourth of the volume of water that can be extracted from the well at that time. Water formation and well water volume also may serve as indicators of the formation size.

The aprotic solvent will be allowed to remain in the well from four to twenty-four hours and forms an aprotic solvent solute with the solids and debris in the well and formation. The contact time needed to perform effective cleansing and dissolution of well and formation debris is related to the composition of the initial water content and well obstruction media samples which have previously been taken and analyzed before secondary recovery operations commenced. Proper contact time duration provides for maximum aprotic solvent exposure, penetration and maximum absorption of similar aprotic compounds. Aprotic solvents, such as methylene chloride, have a much lower specific gravity and density than water and the well obstructions, such as paraffins and hydrogen sulfides. As such, instead of spreading out into the formation upon introduction to the well, aprotic solutions will tend to penetrate almost straight down vertically into formation after leaving the well bore. This is a very effective mechanism for cleaning the production zone within the formation extending away from the well bore.

Next, the aprotic solvent solute is extracted from the well bore (Step 204). This can be accomplished via natural formation pressure or a mechanical vacuum or pump means as is known in the art. Upon removal, the aprotic solvent solute is analyzed to determine what percentage of its solvating capacity has been retained. A sample will be taken to see if it can be reinjected into the well as determined by chemical analysis of the chemical concentrations existing in the well and formation (Step 206). For reinjection, the target concentration in the preferred embodiment is for the aprotic solvent solute to be carrying approximately 75% or more of its solvating capacity (Step 208). If the solvating capacity is found to be less than approximately 75% of its initial solvating capacity, the extracted aprotic solvent solute is then transported to a disposal well or facility in an acceptable transportation medium (Step 210).

Next, in order to remove other formation obstructions which do not react with aprotic solvents, a "protic" solvent is introduced into the well bore and formation (Step 214). A protic solvent may be defined as a solvent which readily accepts or donates a proton during a chemical reaction. In the preferred embodiment of the present invention, a protic chemical with chemical characteristics of a strong base, such as sodium hydroxide (NaOH), is injected into the well bore and allowed to flow into the geologic formation.

A strong base, such as sodium hydroxide, is utilized for two significant reasons. First, sodium hydroxide has a specific gravity and density very similar to the well bore and geological formation debris and the protic solvent's concentration can be manipulated to more closely match the chemical composition of the well bore and geologic formation debris. These chemical characteristics enable the sodium hydroxide to penetrate out into the formation, unlike the methylene chloride, which penetrates mainly in a downward vertical direction. Second, aprotic solvents do not completely react or solvate every type of well or formation debris found within a typical gas well or formation. By introducing a protic solvent, such as sodium hydroxide (NAOH), after removing the aprotic solvent from the well and formation, any remaining debris in the well and formation which do not react well with aprotic solvents are then removed when contacted with a protic solvent. Still another compelling reason for using sodium hydroxide is that it is a strong electrolyte and will completely dissolve in water.

A protic solvent employs an acidic hydrogen that is attached to an oxygen or nitrogen molecule to tear apart ionic compounds such as Iron II chloride and Iron III chloride, one of the "salts" commonly found in gas wells and formations. Ionic compounds, which are usually present in gas wells and formations, include salts produced by various chemical reactions occurring naturally or by previous well operations. For instance, previous acid washes used to "clean" gas wells result in the deposition of salts. Hydrochloric acid is commonly used in conducting an acid wash of a gas well. Chemically, when HCL is put into solution it completely disassociates into $H^+$ and $Cl^-$ ions and is a very strong electrolyte. The chlorine ion is then "free" to bond with other present chemical elements including iron present in the well and formation. This creation of salts leaves deposits in the well and results in larger amounts of well and formation obstructions.

Sodium hydroxide is utilized in the present invention due to its cationic properties. These cations are much less likely to bond with downhole or formation compounds. Likewise, sodium hydroxide is easily extracted from the well with water. Sodium hydroxide also has the optimal energy configuration level for the method disclosed herein. Hydrochloric acid and sulfuric acid ($H_2SO_4$) have historically been used as two common acid washes which have energy configurations that differ too greatly from the chemical energy configurations present in the well and formation debris. Sticking with the principle of "like dissolves like," the present invention dictates the use of the closest similar compound to dissolve the downhole obstructions and debris. In view of the chemical makeup and chemical energy associated with downhole and formation debris, sodium hydroxide is the most efficient compound, on a chemical energy basis, with which to remove same. This principle of chemical energy explains why acid jobs are often ineffective. Due to the chemically weak nature of HCL, it has a tendency to form new compounds and leave salts behind.

In contrast, sulfuric acid is too strong and tends to damage the well and formation Strong acids can damage the well bore in several ways. For example, acidic ions will attack a the natural basic environment. Acidic ions can damage older pipes and casing used in and for the well bore. Acids form salts that can further obstruct the well and formation. Moreover, acids can dissolve the formation thereby causing a decrease in formation porosity and resulting in an increase in the drag force present therein.

In calculating the appropriate amount of protic solvent to inject into the well, an initial sample of the downhole environment will be reviewed and actually tested with a measured amount of protic solvent, in this example sodium hydroxide. In this embodiment, the samples will be tested against 10 known concentrations of sodium hydroxide. The concentration that dissolves the sample most effectively, while retaining a low specific gravity, will be used for injection into the well. This process can be standardized and adjusted for each well. In the preferred embodiment, the volumetric amount of protic solvent injected into the formation will generally be equivalent to ten times the amount of aprotic solvent previously injected into the well formation.

It is desired that the protic solvent will infiltrate and penetrate a much larger portion of the formation than that of the aprotic solvent. After a saturation period ranging between twenty four and seventy two hours, the formation of a protic solvent solute occurs by the reaction of the protic solvent, solids and debris in the well and formation. The protic solvent solute will be extracted from the formation and well (Step 216) and sampled for remaining solvating capacity (Step 218). If the solvating capacity of the protic solvent solute is greater than or equal to approximately 75% of its initial solvating capacity, it will be reinjected into the well for further reaction with the remaining well and formation debris (Step 220). If the solvating capacity is less than approximately 75%, the protic solvent solute will be transported to a disposal area in an acceptable medium (Step 222).

The steps in the method disclosed above will be repeated as necessary to effectively clean the well and formation. Repetition of the method will ensure the most effective cleaning possible. One may determine that the target solvent capacities for either the protic or aprotic solvents and solutes may be increased or decreased accordingly for different operational conditions as is known to those of ordinary skill in the art. The target solvating capacities disclosed in the preferred embodiment herein are not to be construed as limiting the various combinations in which the present invention may be practiced. Additionally, a steam or acid wash may be used in conjunction with the inventive process disclosed herein to further enhance secondary recovery operations on the subject well and formation.

After effectively treating the well with the method and system disclosed herein, the following well conditions should be observed wherein: (1) a decrease in vacuum pressure of the well bore, (2) an increase in the propane and butane gradient factor, (3) a decrease in inter-surface tension in well bore/subterranean geological formations, (4) the destruction and removal of well debris and associated solids, (5) restoration of the well to an environment closer to the natural formation environment, and, (6) the removal of acid salts built up in the well from prior secondary recovery cleaning jobs.

The description of the present invention has been presented for purposes of illustration and description, and is not intended to be exhaustive or limited to the invention in the form disclosed. Many modifications and variations will be apparent to those of ordinary skill in the art.

What is claimed is:

1. A method of cleaning a gas well comprising:
    injecting into a well an aprotic solvent wherein an aprotic solvent solute is formed from the reaction of the aprotic solvent, solids and debris in the well and surrounding formation;
    removing said aprotic solvent solute from the well and formation;
    injecting into the well a protic solvent wherein a protic solvent solute is formed from the reaction of the protic solvent, solids and debris in the well and surrounding formation; and,
    removing said protic solvent solute from the well and formation.

2. The method of claim 1 wherein the aprotic solvent is chosen from the group consisting essentially of ethers, ketones and halogenated hydrocarbons.

3. The method of claim 1 wherein the aprotic solvent is dimethyl sulfoxide.

4. The method of claim 1 wherein the aprotic solvent is acetone.

5. The method of claim 1 wherein the aprotic solvent is dimethyl formamide.

6. The method of claim 1 wherein the aprotic solvent is tetrahydrofuran.

7. The method of claim 1 wherein the aprotic solvent is methylene chloride.

8. The method of claim 1 wherein the protic solvent is water.

9. The method of claim 1 wherein the protic solvent is ammonia.

10. The method of claim 1 wherein the protic solvent is hydroxide.

11. The method of claim 1 wherein the protic solvent is caustic soda.

12. The method of claim 1 wherein the protic solvent is sodium hydroxide.

13. The method of claim 1 further comprising determining the solvating capacity of the aprotic solvent solute.

14. The method of claim 1 further comprising determining the solvating capacity of the protic solvent solute.

15. A system for cleaning a gas well comprising:
    means for injecting into a well an aprotic solvent wherein an aprotic solvent solute is formed from the reaction of the aprotic solvent, solids and debris in the well and surrounding formation;
    means for removing said aprotic solvent solute from the well and formation;
    means for injecting into the well a protic solvent wherein a protic solvent solute is formed from the reaction of the protic solvent, solids and debris in the well and surrounding formation; and,
    means for removing said protic solvent solute from the well and formation.

16. The system of claim 15 wherein the aprotic solvent is chosen from the group consisting essentially of ethers, ketones and halogenated hydrocarbons.

17. The system of claim 15 wherein the aprotic solvent is chosen from the group consisting essentially of dimethyl sulfoxide, acetone, dimethyl formamide, tetrahydrofuran and methylene chloride.

18. The system of claim 15 wherein the protic solvent is chosen from the group consisting essentially of water, ammonia, hydroxide, caustic soda and sodium hydroxide.

19. The system of claim 15 further comprising means for determining the solvating capacity of the aprotic solvent solute.

20. The system of claim 15 further comprising means for determining the solvating capacity of the protic solvent solute.

* * * * *